(12) United States Patent
Bayersdorfer et al.

(10) Patent No.: US 7,441,931 B2
(45) Date of Patent: Oct. 28, 2008

(54) LIGHTING SYSTEM FOR DISPLAYS IN VEHICLES

(75) Inventors: Bernhard Bayersdorfer, Baierbach (DE); Lars Grune, Landstrut (DE)

(73) Assignee: Lisa Dräxlmaier GmbH, Vilsbiburg (DE)

(*) Notice: Subject to any disclaimer, the term of this patent is extended or adjusted under 35 U.S.C. 154(b) by 563 days.

(21) Appl. No.: 10/742,840

(22) Filed: Dec. 23, 2003

(65) Prior Publication Data

US 2004/0213008 A1 Oct. 28, 2004

(30) Foreign Application Priority Data

Dec. 23, 2002 (DE) ................. 102 60 831

(51) Int. Cl.
*B60Q 3/04* (2006.01)
*G01D 11/28* (2006.01)
*G08B 5/36* (2006.01)

(52) U.S. Cl. ............. 362/489; 362/23; 362/29; 362/545; 340/815.55

(58) Field of Classification Search ............ 362/23, 362/29, 30, 84, 489, 491, 545, 27, 612, 613; 40/542–544, 546, 550, 579; 345/36, 39; 340/815.55–815.57
See application file for complete search history.

(56) References Cited

U.S. PATENT DOCUMENTS

| | | | | |
|---|---|---|---|---|
| 3,262,224 A * | 7/1966 | Hardesty | ............. | 362/84 |
| 4,012,632 A | 3/1977 | Stone | | |
| 4,768,300 A * | 9/1988 | Rutili | ............. | 40/546 |
| 5,003,433 A * | 3/1991 | Fournier | ............. | 362/29 |
| 5,249,104 A * | 9/1993 | Mizobe | ............. | 362/545 |
| 5,537,300 A * | 7/1996 | Kraines et al. | ............. | 362/613 |
| 5,555,161 A * | 9/1996 | Roe et al. | ............. | 362/555 |
| 5,572,817 A * | 11/1996 | Chien | ............. | 40/544 |
| 5,747,756 A * | 5/1998 | Boedecker | ............. | 200/314 |
| 5,839,810 A * | 11/1998 | Hersel et al. | ............. | 362/29 |
| 6,217,183 B1 * | 4/2001 | Shipman | ............. | 362/30 |
| 6,357,904 B1 * | 3/2002 | Kawashima | ............. | 362/84 |
| 6,404,463 B1 | 6/2002 | Knoll et al. | | |
| 6,409,355 B1 * | 6/2002 | Simon et al. | ............. | 362/23 |
| 6,417,779 B1 | 7/2002 | Noll et al. | | |
| 6,467,924 B2 * | 10/2002 | Shipman | ............. | 362/23 |
| 6,595,656 B2 | 7/2003 | Yoda | | |
| 6,652,128 B2 * | 11/2003 | Misaras | ............. | 362/488 |

(Continued)

FOREIGN PATENT DOCUMENTS

DE 8 816 551.5 U1 12/1989

(Continued)

*Primary Examiner*—Alan Cariaso
(74) *Attorney, Agent, or Firm*—Sughrue Mion, PLLC

(57) ABSTRACT

A lighting system (10) for displays, in particular in motor vehicles, comprises: a support (12), at least one first lighting device (14) for a spot-like illumination, which is mounted on the support (12), a planar second lighting device (16) which is arranged on the support (12) and has at least one cut-out (17) or one transparent area, in which or below which the at least one first lighting system (14) is placed, and a transparent cover (18), which is arranged spaced from the support (12) on the side of the support with the first and second lighting devices (14, 16), and which has at least one symbol (20) to be illuminated from behind by the first lighting device (14).

12 Claims, 2 Drawing Sheets

U.S. PATENT DOCUMENTS

Figure 1:
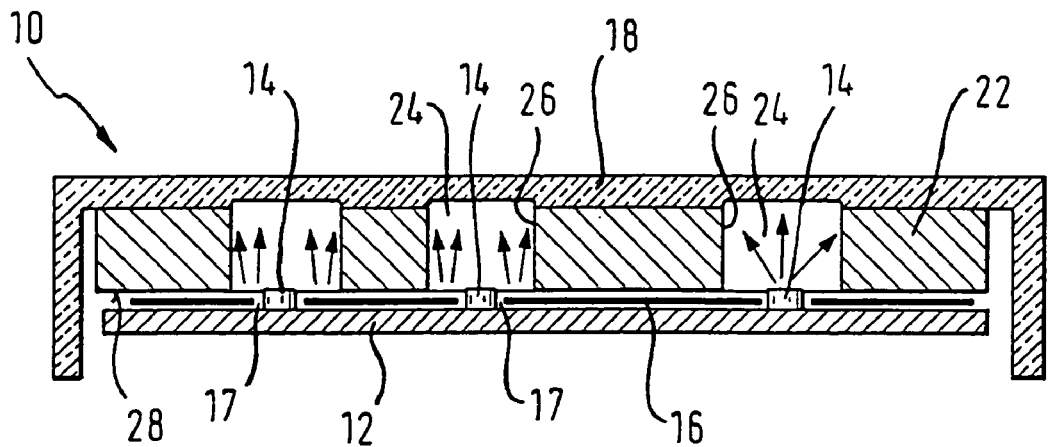

| | | | |
|---|---|---|---|
| 6,871,978 B2 * | 3/2005 | Chan et al. | 362/84 |
| 2001/0004317 A1 * | 6/2001 | Reithmeier | 362/558 |
| 2004/0213008 A1 | 10/2004 | Bayersdorfer et al. | |

FOREIGN PATENT DOCUMENTS

| | | |
|---|---|---|
| DE | 195 29 207 A1 | 2/1997 |
| DE | 197 02 957 A1 | 8/1998 |
| DE | 197 38 666 A1 | 2/1999 |
| DE | 197 40 575 A1 | 3/1999 |
| DE | 196 54 418 A1 | 6/1999 |
| DE | 199 35 386 A1 | 2/2001 |
| DE | 102 60 831 B3 | 4/2004 |
| EP | 0 847 889 A2 | 6/1998 |

* cited by examiner

LIGHTING SYSTEM FOR DISPLAYS IN VEHICLES

FIELD OF THE INVENTION

The invention relates to a lighting system for displays in vehicles which may particularly be used in motor vehicles but also in other vehicles of any kind. These lighting systems serve the purpose to illuminate from behind symbols in various colours and different degrees of brightness, so as, on the one hand, to make visible the symbol in darkness and to indicate this to the driver when the function is activated, on the other hand. Examples for the use of such illuminated symbols are e.g. the switch for the rear window heating of an automobile, displays on the gearshift lever, ventilation settings and the like.

The lighting of these displays serves the purpose that the driver can recognize the display in darkness in order to be able to activate the same, if required. On the other hand, the lighting is intended to ensure that the driver is able to recognize both in daylight and darkness whether the function, which is shown on the display as a symbol, is activated or deactivated.

PRIOR ART

In order to ensure those functions, i.e. a search lighting (having a brightness of typically several $cd/m^2$), on the one hand, and a function lighting (having a brightness typically ranging between 100 to 3000 $cd/m^2$), on the other hand, it was hitherto known to provide a uniform background or search lighting of the symbols by light-emitting diodes. Directly beside the symbol, a small window is provided. Behind this window, an optical fiber is disposed which is connected to a bright light-emitting diode (LED) of another colour and which causes the window area, which is mostly rectangular or circular and has a diameter or a lateral length of approximately 2 mm, to light up brightly. Thus, both the search lighting and the function lighting, i.e. the lighting during an activated function, are realized by light-emitting diodes, i.e. spot-like illumination means.

An arrangement for lighting the shifting position display on the gearshift lever of a variable-speed transmission is, for example, known from DE 195 29 207 C2. The gearshift diagram, i.e. the symbols to be lightened, is mounted on a transparent disk. Below the disk on a circuit board, one light-emitting diode each is soldered below each of the shifting position symbols. These light-emitting diodes serve the purpose to make the shifting position displays visible in a softly lighted manner when the vehicle lighting is switched on. If a corresponding shifting position is engaged, additional light-emitting diodes are activated which serve for an additional brightening of the shifting position symbol of the respectively engaged gear or the thresholds for switching-over to the next-higher or next-lower gear.

An illuminated shifting position display is also known from DE 296 06 501 U1 for manually operating the variable-speed transmission of a motor vehicle. The display area of the lever switch is permanently diffusely illuminated, the light sources being light bulbs or glow lamps, light-emitting diodes or the light-emitting ends of one or several optical fiber cables, i.e. spot-like lighting media. The gear selected by the driver is finally additionally marked in that the corresponding symbol on the cover is highlighted by an enhanced brightening-up in the display area illuminated permanently and uniformly diffusely. The solution according to DE 296 06 501 U1 uses for this purpose a mirror or a prism which is guided in parallel to the movement of the gearshift lever. It reflects a part of the light beams emitted from the light source at an angle such that the corresponding symbol is illuminated from below in an enhanced manner. Thus, this solution only uses lighting equipment, i.e. spot-like lighting equipment, which illuminating power is enhanced in accordance with the requirements for brightening-up a certain area of the symbols in that the light is correspondingly directed.

SUMMARY OF THE INVENTION

It is the object of the invention to provide a structurally simple and economical lighting system for displays, in particular in motor vehicles, which ensures a search lighting as well as a function lighting.

The invention is based on the idea to provide the search lighting by a planar lighting medium which is interrupted only by small cut-outs or transparent areas, in which a lighting device for the function lighting is placed. The lighting system emits the light essentially spot-like, i.e. starting from one spot. It is possible to obtain on the one hand a uniform planar illumination of all symbols by the combination of the two lighting media such that the driver and/or the passengers can easily recognize the symbol also in darkness. On the other hand, a targeted brightening-up is obtained when the function is activated on which the display is based by the spot-like lighting medium, which can specifically also illuminate only areas of the entirety of symbols from behind, when e.g. a shifting position display is concerned, so that only the gear presently engaged or the shifting position just selected is illuminated from behind.

This lighting device for the spot-like lighting is brighter than the planar lighting device such that the activated function lighting which indicates the activated function is recognizable also in sunlight.

The window or the transparent area of the planar lighting device only causes a minimum brightness loss of the planar lighting device in the area of the symbol, which may, however, be eliminated for example by suitable illuminating-power-attenuation measures of the planar lighting device such as e.g. an additional inscription, so that due to the planar lighting device the overall lighting is uniform and has the same intensity over the entire area.

Advantageous embodiments are characterized by the remaining claims.

According to a preferred embodiment, the first lighting device, i.e. the lighting device for a spot-like lighting, is designed as a light-emitting diode (LED). In the planar lighting device, cut-outs are provided at those locations at which the light-emitting diodes are provided, such that the light-emitting diodes are placed in this cut-outs and extend through the planar lighting device. Alternatively, the area of the planar lighting device, below which the light-emitting diode is disposed, is designed as a transparent window of the planar lighting device such that the light of the light-emitting diode shines through the transparent window of the planar lighting device.

Various colours and different degrees of brightness are known for light-emitting diodes, so that the light-emitting diode may be selected in accordance with design considerations, on the one hand, or, depending on the symbols to be presented with respect to colour or the brightness to be obtained, on the other hand, in order to design the light of the light-emitting diode so that it is also visible in daylight.

The second lighting device, i.e. the planar lighting device, is preferably designed as a foil, and, in particular, as an electroluminescence foil. The electroluminescence foil as a planar lighting medium is flat, thin and ensures a uniform search lighting. Further, the foil can e.g. be inscribed, so that the brightness loss, which occurs due to the cut-out or punching-out in the area of the first lighting device, can be produced by inscription in the remaining areas, so that the light emitted by the electroluminescence foil is uniform and uniformly bright.

The support on which the lighting devices are arranged is preferably designed as a board in which the connections for the light-emitting diodes are provided. Depending on the requirements, a plurality of connections for light-emitting diodes and/or for first and second lighting devices may be provided if, for example, the gear display symbols should be illuminated from behind on the gearshift lever as a special application, and when the gear is engaged, only that gear should be illuminated from behind which is presently activated. This means that depending on which gearshift position, one light-emitting diode is provided which lights up when the gear is correspondingly activated. Thus, the number and the position of the first lighting devices may be adapted in accordance with the requirements.

The side of the cover facing the support is preferably equipped with a diffusion disk or the cover itself is milky.

This allows that the light deflected from the light-emitting diode or the first lighting device is uniformly scattered, which ensures that the symbols are uniformly illuminated by the light-emitting diode or the first lighting device. The light of the light-emitting diode or the first lighting device does not in particular appear as a cone of light at the viewing side of the cover, i.e. at the side towards the driver, but as scattered light which glows uniformly.

In accordance with a particularly preferred embodiment, a lighting-limiting device is further provided between the support, on which the first and second lighting devices are arranged, and the cover, which device limits the light emitted by the first lighting device to an area of the cover which is to be illuminated from behind.

This is advantageous in particular when a plurality of first lighting devices are provided so as to illuminate from behind only a certain part of the display, i.e. exactly that part whose function is presently activated, for example as was the case with the gearshift position display on the gearshift lever, where a plurality of different functions (e.g. gears) are represented. It can be avoided by the provision of such a lighting-limiting device that neighbouring regions are discoloured or brightened by scattered light from the first lighting device which is presently active.

According to a preferred embodiment, the lighting limiting device is designed as a transparent spacer plate. This spacer plate has holes which correspond to the area of the cover to be illuminated from behind by the first lighting device. Due to the transparency of the spacer plate, light from the second lighting device may freely pass therethrough, so that the brightness of this light is not attenuated. The scattered light of the first lighting device, i.e. e.g. the light of the light-emitting diode, impinges on the inner surfaces of the holes of the spacer plate, at which it is reflected due to a suitable design of these inner surfaces, so that it does not enter into the neighbouring regions. The holes of the spacer plate, which are designed like windows, may have any form depending on the requirements, e.g. they may be square or round or even be adapted to the shape and the size of the symbols to be illuminated from behind. If the spacer plate has, for instance, a thickness of about 2 mm, and if the holes having a window size of about 4 mm×4.5 mm accommodate a light-emitting diode, which has e.g. a size of about 1.3 mm×0.8 mm, the symbols are uniformly illuminated, with an excessive widening of the light of the light-emitting diode and thus an undesired brightening of the neighbouring regions by the reflecting inner surfaces of the holes of the spacer plate being simultaneously avoided. If a diffusion disk is used so as to cause the light to appear more uniform, this may—as was already mentioned—also be mounted on the spacer plate if a spacer plate is provided, instead of being mounted to the cover.

The inner surfaces of the holes of the spacer plate, i.e. those surfaces which extend essentially vertically to the cover area or the support area, are advantageously varnished or polished. This causes the light of the light-emitting diode or the first lighting device to be well reflected such that no light will enter into the neighbouring regions and cause an undesired brightness there.

If a spacer plate is used, it is also possible to compensate the brightness loss of these areas caused by the holes or the transparent areas of the second lighting medium in the remaining region of the second lighting device in that the areas of the spacer plate facing the support are subjected to a corresponding surface treatment which allows only a partial light transmission.

Instead of polishing or varnishing the inner walls of the windows of the spacer plate, it may also be possible to provide additional windows in the spacer plate so as to produce a renewed refraction of the light such that no light is reflected towards the surface of the spacer plate (i.e. the side facing the cover) which could lead to an undesired brightening or to an undesired discolouring in areas which are not intended to be illuminated.

As an alternative to the lighting limiting device by the transparent spacer plate, it is preferred to provide an optical fiber as a lighting-limiting device. The desired screening is also obtained by this optical fiber disposed between the support and the cover in the area to be illuminated from behind by the first lighting device.

Finally, it is also preferred to provide an injection-moulded part (a so-called light bulkhead) as the lighting-limiting device, which is arranged between the support and the cover and which is opaque. This injection-moulded part limiting the area to be illuminated from behind may e.g. be applied around the light-emitting diode in the form of a tube such that an emission of scattered light from the tube-like section, in which the light-emitting diode is placed, can be avoided.

Finally, a combination of a light bulkhead and a spacer plate is also conceivable as lighting-limiting device, with the light bulkhead being inserted into the holes of the spacer plate. This is advantageous especially in cases in which it is difficult, e.g. because of geometrical problems, to treat the inner walls of the windows, e.g. by varnishing, such that a total reflection will occur.

A particularly preferred embodiment consists in that the first lighting device to be applied e.g. at a distance of 2 mm from the cover. Sufficient widening of the light emitted by the first lighting device, in particular the light-emitting diode, is thereby possible, so that a uniform illumination of the symbols from behind at the cover can be achieved.

SHORT DESCRIPTION OF THE DRAWINGS

Figure 2:
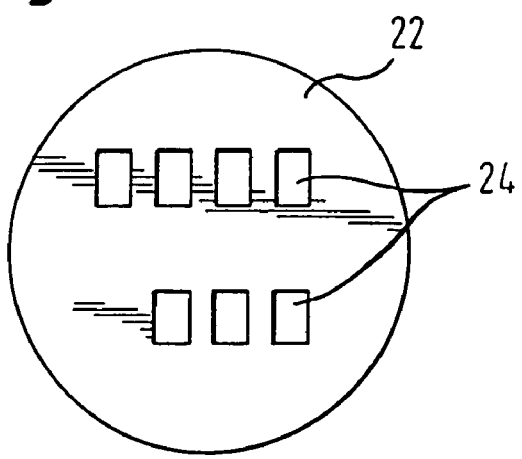
Figure 3:
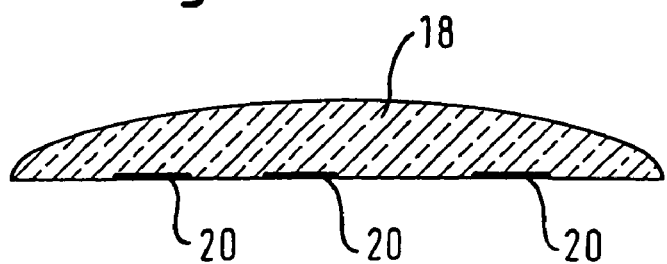

In the following, the invention is described only by way of example by means of the accompanying Figures, in which FIG. 1 shows a cut through a lighting apparatus according to the invention;

FIG. 2 shows a plane view from above of a spacer plate which may e.g. be used for the illumination of a gearshift lever; and FIG. 3 shows a cut through a cover which may also be used for the lighting system of a gearshift lever.

Figure 4:
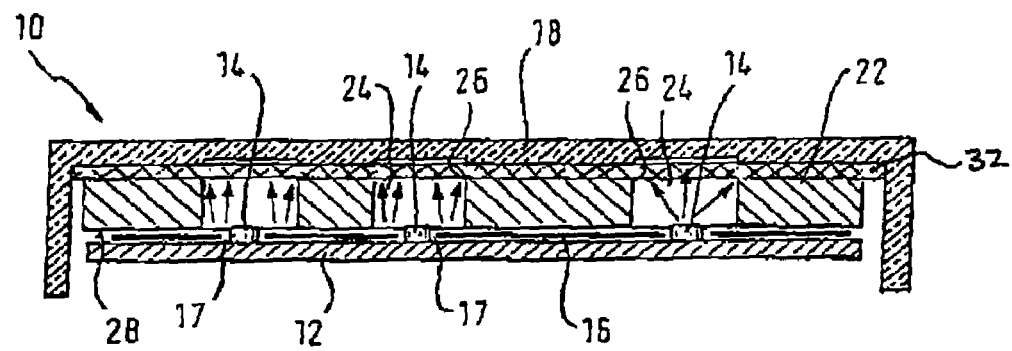
Figure 5:
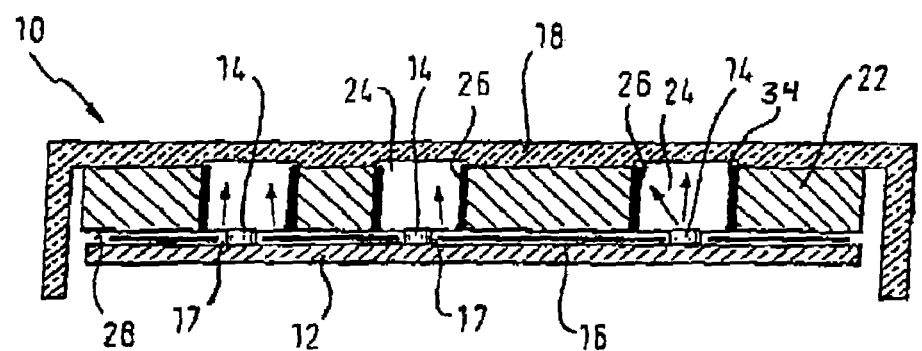
Figure 6:
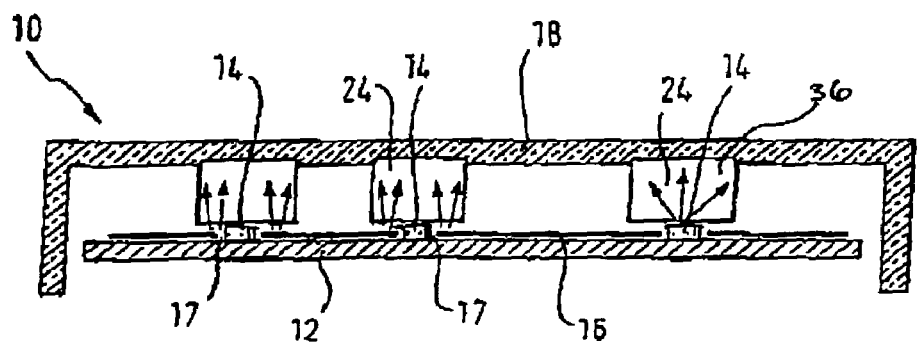

FIGS. 4, 5, and 6 show cut through the lighting apparatuses according to exemplary aspects of the present invention.

PATHS FOR THE REALIZATION OF THE INVENTION

FIG. 1 shows a cut through a lighting system according to the invention which may e.g. be used for the illumination of gearshift levers in motor vehicles. The lighting system 10 comprises a support 12 which is designed as a board, on which connections for light-emitting diodes 14 are provided as first lighting devices and for an electroluminescence foil 16 as second lighting device. The foil 16 essentially extends over the entire surface of the support 12 which faces the cover 18.

The cover 18 itself represents the limitation of the lighting system which is visible to the passengers, i.e. the viewing side of the lighting system. The cover 18 is, for example, clear, i.e. completely transparent, with symbols 20 being applied to the rear side of the bottom of the cover 18 by engraving, screen printing or by a hot stamping foil, as shown e.g. in FIG. 3. The cover 18 is e.g. produced of a transparent poly(methyl methacrylate) material. The cover 18 may alternatively also be produced of a milky screen material.

As shown in FIG. 4, a diffusion disk 32 is applied to the under side of the cover 18 which scatters the light emitted by the light-emitting diodes 14 so that the entire area of the cover 18 to be illuminated from behind by a light-emitting diode 14 is uniformly illuminated.

Between the cover 18 and the support 12 with the lighting devices 14 and 16 fastened thereto, a spacer plate 22 is provided in the embodiment shown in FIG. 1. This spacer plate 22 as shown in FIG. 2 as a plane view comprises cut-outs 24 which correspond to the areas as which the symbols 20 are provided on the cover 18, which are to be illuminated as function lighting from behind by the light-emitting diodes 14. The lateral faces 26 of the cut-outs 24 of the spacer plate 22 are polished, varnished or provided with transparent inserts, so-called light bulkheads, such that the light emitted from the light-emitting diodes 14 and impinging on these lateral faces 26 is reflected there and thus does not enter the areas and reaches the surface of the cover plate 18 on which the spacer plate 22 is provided. Rather, the light emitted from the light-emitting diodes 14 remains in those areas which are cut out in the spacer plate 22, by which scattered light beside the symbols to be illuminated is avoided. As illustrated in FIG. 5, an injection-moulded part may be inserted in the cut-outs of the spacer plate 22.

As shown in FIG. 6, according to an exemplary aspect of the present invention, the light emitted from the light-emitting diodes 14 may be limited to an area of the cover 18 to be illuminated from behind by an optical fiber, such as optical fiber 36, which is mounted between the support 12 and the cover 18.

With a corresponding treatment of the surface of the spacer plate 22 facing the support 12, i.e. the surface 28, the radiation of the foil 16 is additionally uniformly attenuated, so that a loss of brightness in the areas of the foil 16, which results from the cut-outs 17 in the foil 16 for the mount of the light-emitting diodes 14, is compensated by the attenuation of the light by correspondingly treated surfaces of the spacer plate 22.

Instead of the embodiment shown in FIG. 1, in which the foil 16 has holes 17 in which the light-emitting diodes 14 are placed, it is also possible to design the foil 16 to be transparent in these areas and to arrange the light-emitting diodes 14 completely below the foil 16, i.e. covered by the transparent area of the foil.

The windows 24 shown in FIG. 2 correspond to the locations of the symbols 20 on the cover 18. All windows 24 are designed as rectangulars in the embodiment shown. In accordance with the requirements, they may, however, be adapted to the size or the shape of the symbols 20 to be illuminated from behind by the function lighting of the light-emitting diodes 14. A typical window size ranges between about 4.5 mm×4 mm, with the light-emitting diodes 14 arranged therein having a size of about 1.3 mm×0.8 mm (height of 0.65 mm). The punched-out or transparent area of the electroluminescence foil 16 is only slightly larger than the light-emitting diode itself, for example 1.5 mm×0.9 mm.

Further, the light-emitting diode 14 is preferably arranged approximately 2 mm below the cover 18. This ensures that the light emitted by the light-emitting diode 14 can uniformly be expanded and thus illuminate the area of the symbol 20 to be illuminated from behind during the function lighting.

It is therefore possible to ensure a uniform so-called search lighting of the display by the lighting apparatus for displays shown in FIGS. 1 to 3. This is obtained by the illumination emitted by the electroluminescence foil 16. This means that the display is uniformly illuminated from behind in darkness, independent of the function activation, so that the driver or the passenger recognizes the position of the display and simultaneously also recognizes which function is triggered by the activation of the corresponding switch.

It is simultaneously ensured that the driver or the passenger always immediately recognizes when the function of the display or a function shown by the display is e.g. activated in the area of the switch of vehicles. If the symbols applied to the gearshift lever are illuminated from behind by a corresponding lighting system 10, and if e.g. a certain gear is activated, one of the light-emitting diodes 14 shown in FIG. 1 lights up and thereby informs the driver which gear exactly is presently activated. Since no light from the light-emitting diode 14 enters the neighbouring areas of the display, the driver can always exactly recognize which function is activated. In connection therewith, the brightness or the colour of the light-emitting diode 14 is selected such that the function lighting is also visible in daylight, so that a driver will also know during daylight which gear is engaged or which function is activated.

The essential aspect of the present invention therefore consists in providing a combined search and function lighting for displays in motor vehicles which can be realized in a simple manner and which allows an exact illumination from behind of the corresponding areas of the cover during the function illumination.

The invention claimed is:

1. A lighting system for displays in motor vehicles, comprising:
   a support;
   at least one function lighting device for spot-like illumination which is mounted on the support;
   a planar search lighting device which is mounted on the support and which has at least one of a cut-out and a transparent area, in which or below which the at least one function lighting device is placed;
   a transparent cover which covers the at least one function lighting device and the planar search lighting device, which is arranged at a space from the support on the side of the support with the function and search lighting devices, and which has at least one symbol positioned to be illuminated from behind by the function lighting device and the search lighting device; and means for activating said function lighting device only when a function to be represented by said symbol is activated and, thus, independent of said search lighting device.

2. The lighting system according to claim 1, wherein the function lighting device is a light-emitting diode.

3. The lighting system according to claim 1, wherein the search lighting device is an electroluminescence foil.

4. The lighting system according to claim 1, wherein the support is a circuit board.

5. The lighting system according to claim 1, wherein a diffusion disk is mounted to the side of the cover facing the support or wherein the cover is milky.

6. The lighting system according to claim 1, further comprising:
   a lighting-limiting device between the support with the function and search lighting devices and the cover, which limits the light emitted by the function lighting device to one area of the cover to be illuminated from behind.

7. The lighting system according to claim 6, wherein the lighting-limiting device is a transparent spacer plate which is provided with holes corresponding to the area of the cover to be illuminated from behind by the function lighting device.

8. The lighting system according to claim 7, wherein the inner surfaces of the of the spacer plate are varnished or polished.

9. The lighting system according to claim 6, wherein the lighting-limiting device is an optical fiber which is mounted between the support and the cover in the area of the cover to be illuminated from behind by the function lighting device.

10. The lighting system according to claim 6, wherein the lighting-limiting device comprises at least one injection-moulded part which is arranged between the support and the cover and limits the area to be illuminated from behind by the function lighting device.

11. The lighting system according to claim 6, wherein the lighting-limiting device comprises a transparent spacer plate and an injection-molded part which is inserted in holes of the spacer plate.

12. The lighting system according to claim 1, wherein the function lighting system is mounted at a distance of approximately 2 mm from the cover.

* * * * *